US012753632B2

(12) United States Patent
Foss et al.

(10) Patent No.: US 12,753,632 B2
(45) Date of Patent: Oct. 6, 2026

(54) TAMPER-RESISTANT DOOR LOCKING SYSTEM

(71) Applicant: Willo Products Company, LLC, Decatur, AL (US)

(72) Inventors: Stephen Brian Foss, Madison, AL (US); Brian Keith Terry, Locust Fork, AL (US); Kanzaz Bailey, Athens, AL (US)

(73) Assignee: Willo Products Company, LLC, Decatur, AL (US)

( * ) Notice: Subject to any disclaimer, the term of this patent is extended or adjusted under 35 U.S.C. 154(b) by 0 days.

(21) Appl. No.: 19/068,106

(22) Filed: Mar. 3, 2025

(65) Prior Publication Data

US 2025/0283351 A1 Sep. 11, 2025

Related U.S. Application Data

(60) Provisional application No. 63/562,721, filed on Mar. 8, 2024.

(51) Int. Cl.
*E05B 17/20* (2006.01)

(52) U.S. Cl.
CPC ...... *E05B 17/2053* (2013.01); *E05B 17/2092* (2013.01)

(58) Field of Classification Search
CPC ......................... E05B 17/2053; E05B 17/2092
USPC ........................................................... 70/125
See application file for complete search history.

(56) References Cited

U.S. PATENT DOCUMENTS

| | | | | |
|---|---|---|---|---|
| 8,528,272 B1 * | 9/2013 | Foss | E05B 15/0205 52/106 |
| 10,094,142 B2 * | 10/2018 | Kondi | E05B 63/06 |
| 11,002,041 B1 * | 5/2021 | Ozier | E05B 15/10 |
| 2021/0002924 A1 * | 1/2021 | Horwood | E05B 15/0013 |
| 2021/0372161 A1 * | 12/2021 | Clifford | E05B 41/00 |
| 2022/0290475 A1 * | 9/2022 | Cheng | E05B 65/0811 |

FOREIGN PATENT DOCUMENTS

| | | | |
|---|---|---|---|
| GB | 2051214 A * | 1/1981 | E05C 9/025 |

* cited by examiner

*Primary Examiner* — Nathan Cumar
(74) *Attorney, Agent, or Firm* — Miller Johnson

(57) ABSTRACT

A lock system includes a first housing, a plug, and a deadlock system. The first housing including a first side defining an opening. The plug is disposed within the first housing and is configured to move within the opening between an open position and a plugged position. The deadlock system is disposed within the first side of the first housing and coupled to the plug. The deadlock system is configured to move between a first position and a second position. The deadlock system (i) inhibits movement of the plug in the first position and (ii) allows movement of the plug in the second position.

23 Claims, 12 Drawing Sheets

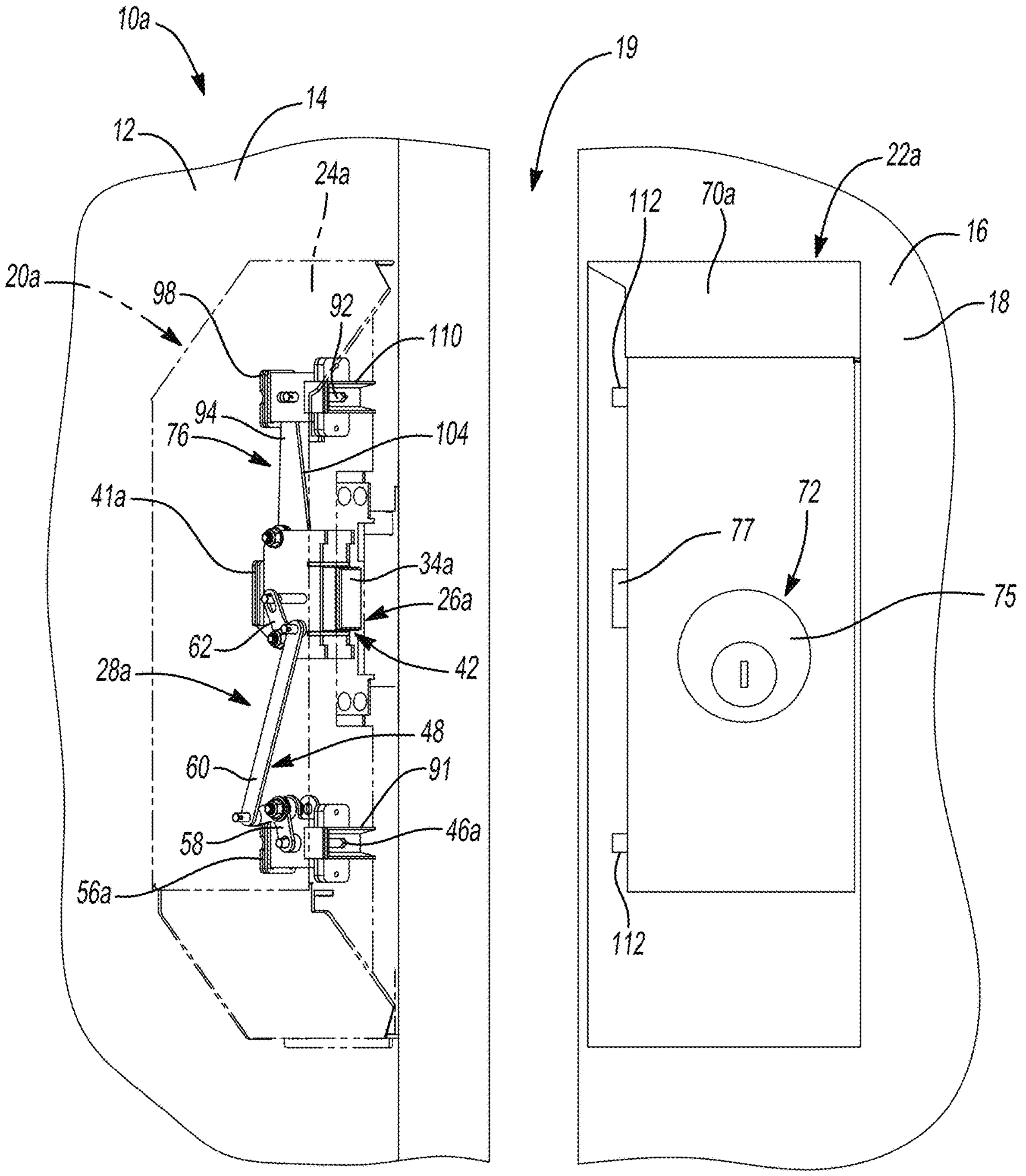
IFig-3A

TAMPER-RESISTANT DOOR LOCKING SYSTEM

CROSS-REFERENCE TO RELATED APPLICATION

This application claims priority to U.S. Provisional Application No. 63/562,721 filed Mar. 8, 2024, the entire disclosure of which is incorporated by reference.

FIELD

The present disclosure relates to a tamper-resistant locking system for a door and, more particularly, to a locking system including an assembly for plugging an opening formed in a strike plate.

BACKGROUND

Door locking systems are essential components for securing doors at prisons and various other properties and facilities. These systems are typically attached to the exterior side of a door, allowing authorized individuals to access a room (e.g., a prison cell) on the interior side of the door, and preventing unauthorized individuals from opening the door and exiting the room on the interior side of the door. The security of these door locking systems can be compromised if the housing enclosing the locking system is susceptible to tampering or forced entry. For example, tampering with the door locking system or components thereof can prevent an aperture or opening formed in one of the door or a frame in which the door is received from receiving a lock bolt disposed on the other of the door or the frame, which, in turn, can prevent the door from being secured in a closed position relative to the frame.

While known systems and methods for securing door locking systems may be acceptable for their intended purposes, there exists a continuous need in the pertinent art for an improved system and method for inhibiting tampering with a door locking system.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

One aspect of the disclosure provides a lock system. The lock system includes a first housing, a plug, and a deadlock system. The first housing including a first side defining an opening. The plug is disposed within the first housing and is configured to move within the opening between an open position and a plugged position. The deadlock system is disposed within the first side of the first housing and coupled to the plug. The deadlock system is configured to move between a first position and a second position. The deadlock system (i) inhibits movement of the plug in the first position and (ii) allows movement of the plug in the second position.

Another aspect of the disclosure provides a lock system. The lock system includes a first housing, a plug, and a first actuation system. The first housing includes a first side defining an opening. The plug is disposed within the first housing and configured to move within the opening between an open position and a plugged position. The first actuation system is disposed within the first side of the first housing and configured to move between a first position and a second position. The first actuation system (i) moves the plug from the plugged position to the open position when the first actuation system moves from the first position to the second position, and (ii) secures the plug in the plugged position when the first actuation system moves from the second position to the first position.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 3A is a perspective view of another door locking system in a first orientation according to the principles of the present disclosure.

In the drawings, reference numbers may be reused to identify similar and/or identical elements.

DETAILED DESCRIPTION

Figure 1A:
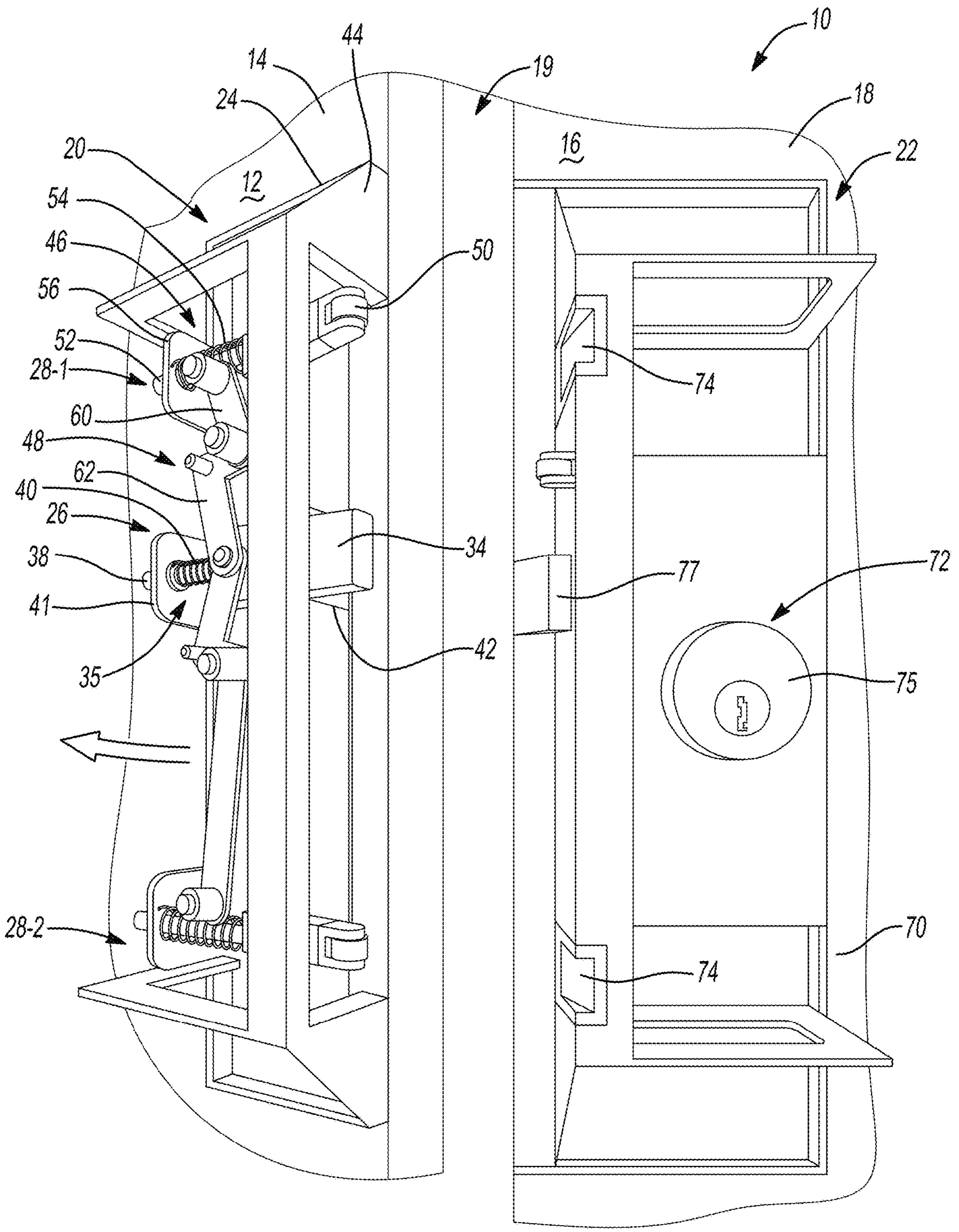
FIG. 1A is a perspective view of a door locking system in a first orientation according to the principles of the present disclosure.
Figure 1B:
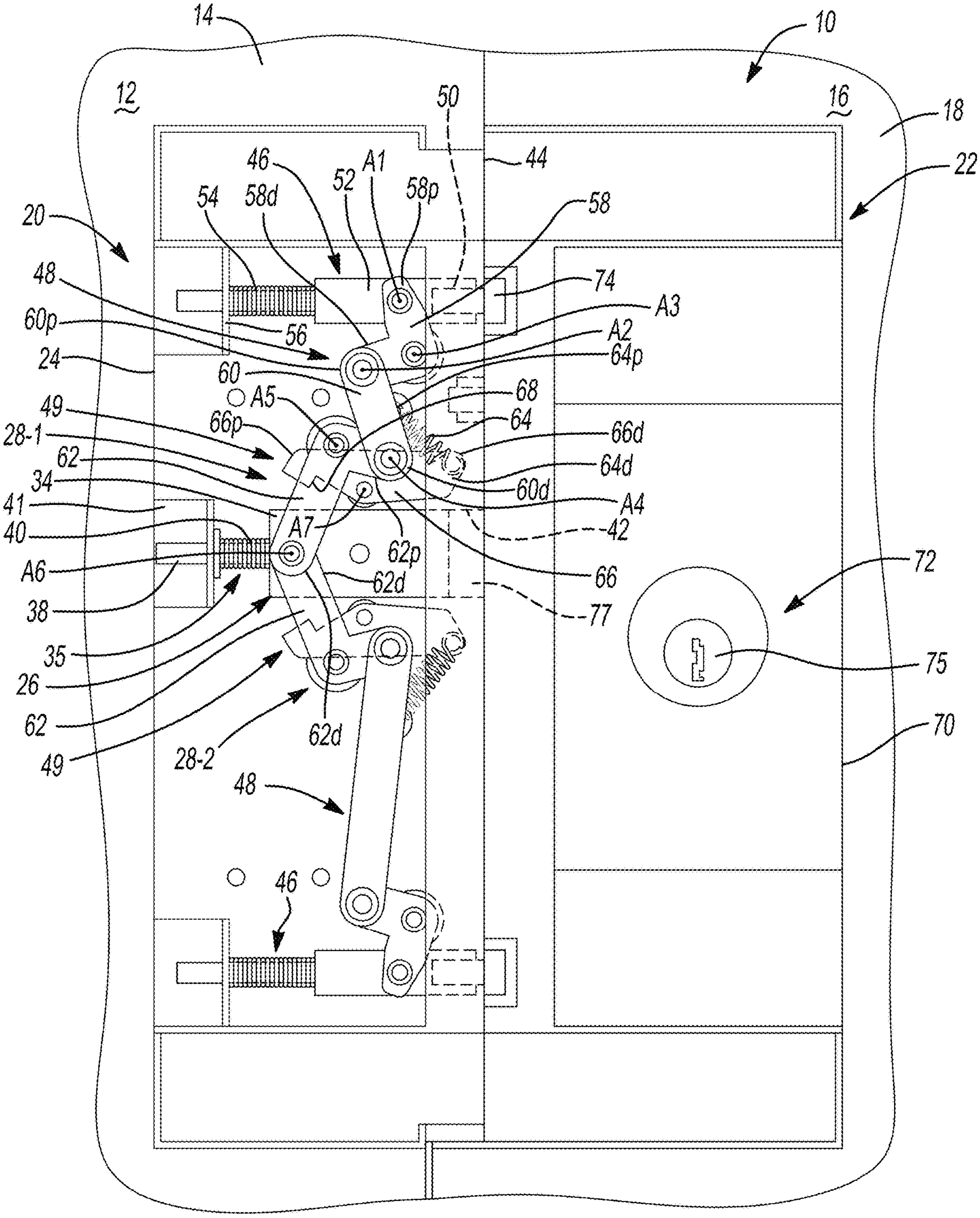
FIG. 1B is a perspective view of the door locking system of FIG. 1A in a second orientation according to the principles of the present disclosure.

Referring to FIGS. 1A and 1B, a lock system 10 is illustrated. As will be explained in more detail below, the lock system 10 may be mounted on an exterior surface 12 of a door 14 and an exterior surface 16 of a wall 18 to secure the door 14 in a closed orientation (FIG. 1B) relative to the wall 18. The door 14 may pivot (e.g., clockwise) relative to the wall 18 from an open orientation (FIG. 1A) to the closed orientation (FIG. 1B) to inhibit passage through an opening 19 defined by the door 14 and the wall 18. Conversely, the door 14 may pivot relative to the wall 18 from the closed orientation (FIG. 1B) to the open orientation (FIG. 1A) to allow passage through the opening 19.

The lock system 10 may include a first housing assembly 20 and a second housing assembly 22. While the first housing assembly 20 is generally shown and described herein as being mounted on the door 14, and the second housing assembly 22 is generally shown and described herein as being mounted on the wall 18, it will be appreciated that the first housing assembly 20 may be mounted on the wall 18, and the second housing assembly 22 may be mounted on the door 14 within the scope of the present disclosure. In some implementations, the first housing assembly 20 may be the door 14 or the wall 18 or be mounted within the door 14 or the wall 18, and the second housing assembly 22 may be the other of the door 14 or the wall 18 or be mounted within the other of the door 14 or the wall 18. In this regard, the door 14 may be the first housing assembly 20 or the second housing assembly 22, and the wall 18 may be the other of the first housing assembly 20 or the second housing assembly 22.

The first housing assembly 20 may include a first housing 24, a plug subassembly 26, and one or more actuation systems 28. For example, the first housing assembly 20 may include a first actuation system 28-1, and a second actuation system 28-2. The plug subassembly 26, the first actuation system 28-1, and the second actuation system 28-2 may be disposed within the first housing 24. As will be explained in more detail below, the first and/or second actuation systems 28-1, 28-2 may be configured to inhibit movement of the plug subassembly 26 between a plugged position (FIG. 1A) and an open position (FIG. 1B). For example, in a method of operating the lock system 10, movement of the first actuation system 28-1 and/or the second actuation system 28-2 from a first orientation (FIG. 1B, 2B) to a second orientation (FIG. 1A, 2A) may move the plug subassembly from the open position (FIG. 1B) to the plugged position (FIG. 1A) and inhibit movement of the plug subassembly 26 from the plugged position (FIG. 1A) to the open position (FIG. 1B), while movement of the first actuation system 28-1 and/or the second actuation system 28-2 from the second orientation (FIG. 1A, 2A) to the first orientation (FIG. 1B, 2B) may move (e.g., automatically) the plug subassembly 26 from the plugged position (FIG. 1A) to the open position (FIG. 1B). As will be explained in more detail below, engagement of the first actuation system 28-1 and/or the second actuation system 28-2 with the second housing assembly 22 may actuate the first actuation system 28-1 and/or the second actuation system 28-2 from the second orientation (FIG. 1A) to the first orientation (FIG. 1B) and move the plug subassembly 26 from the plugged position (FIG. 1A) to the open position (FIG. 1B). Conversely, disengagement of the first actuation system 28-1 and/or the second actuation system 28-2 from the second housing assembly 22 may move (e.g., automatically) the plug subassembly 26 to the plugged position (FIG. 1A). When the lock system 10 is in the open orientation (FIG. 1A), the plug subassembly 26 may be in the plugged position (FIG. 1A). When the lock system 10 is in the closed orientation (FIG. 1B), the plug subassembly 26 may be in the open position (FIG. 1B).

The plug subassembly 26 may be coupled to the first housing 24 and may include a plug 34 and a plug actuation system 35. In some implementations, the plug actuation system 35 includes a post 38 and a biasing member 40. As illustrated in FIG. 1B, the post 38 may be coupled to the plug 34 and translatably-coupled to the first housing 24. For example, the first housing 24 may include a bracket 41 to which the post 38 is translatably-coupled. In particular, the bracket 41 may define an aperture through which the post 38 is disposed. The biasing member 40 (e.g., a compression spring) may include a first end engaging the plug 34 and a second end, opposite the first end, engaging the bracket 41.

As will be explained in more detail below, during operation of the lock system 10, the plug actuation system 35 may urge movement of the plug 34 from an open position (FIG. 1B) to a plugged position (FIG. 1A). For example, upon moving the door 14 from the closed position (FIG. 1B) to the open position (FIG. 1A), the biasing member 40 may apply a force on the plug 34 and the bracket 41 to urge the plug 34 and the post 38 to translate relative to the first housing 24 (e.g., toward the second housing assembly 22). In the plugged position (FIG. 1A), the plug 34 may extend outside of the first housing 24. In the open position (FIG. 1B), the plug 34 may be retracted within the first housing 24. When the door 14 is in the open orientation (FIG. 1A), the plug 34 may be in the plugged position (FIG. 1A), and when the door 14 is in the closed orientation (FIG. 1B), the plug 34 may be in the open position (FIG. 1B).

The first housing 24 may define an opening 42 disposed on a first side 44 of the first housing 24. When the door 14 is in the closed orientation (FIG. 1B), the first side 44 of the first housing 24 may face the second housing assembly 22. The opening 42 may receive the plug 34. In this regard, the opening 42 may be substantially the same shape and/or size as at least a portion of the plug 34. In some configurations, the opening 42 may be a rectangle. The opening 42 may be slightly larger than the plug 34 to allow the plug 34 to move (e.g., translate) freely through the opening 42. In some configurations, the opening 42 may be sized such that there is a zero or near zero clearance between the plug 34 and the opening 42.

With reference to FIGS. 1A-2B, the first actuation system 28-1 may include an actuator 46, a linkage assembly 48, and a deadlock assembly 49. The actuator 46 may include a wheel 50, post 52, and a biasing member 54. As illustrated in FIG. 1B, the wheel 50 may be rotatably-coupled to the post 52, and the post 52 may be translatably-coupled to the first housing 24. For example, the first housing 24 may include a bracket 56 to which the post 52 is translatably-coupled. For example, the bracket 56 may define an aperture through which the post 52 is disposed. The biasing member 54 (e.g., a compression spring) may include a first end engaging the post 52 and a second end, opposite the first end, engaging the bracket 56.

When the lock system 10 is in the open orientation (FIG. 1A), the actuator 46 (e.g., the wheel 50) may extend outside the first housing 24. For example, the wheel 50 may extend beyond the first side 44 of the first housing 24. When the lock system 10 is in the closed orientation (FIG. 1B) the actuator 46 may be disposed inside the first housing 24. In this regard, as will be explained in more detail below, during operation of the lock system 10, upon moving the door 14 from the closed position (FIG. 1B) to the open position (FIG. 1A), the biasing member 54 may apply a force on the post 52 and the bracket 56 to move the wheel 50 and the post 52 relative to the first housing 24 (e.g., toward the second housing assembly 22).

Figure 2A:
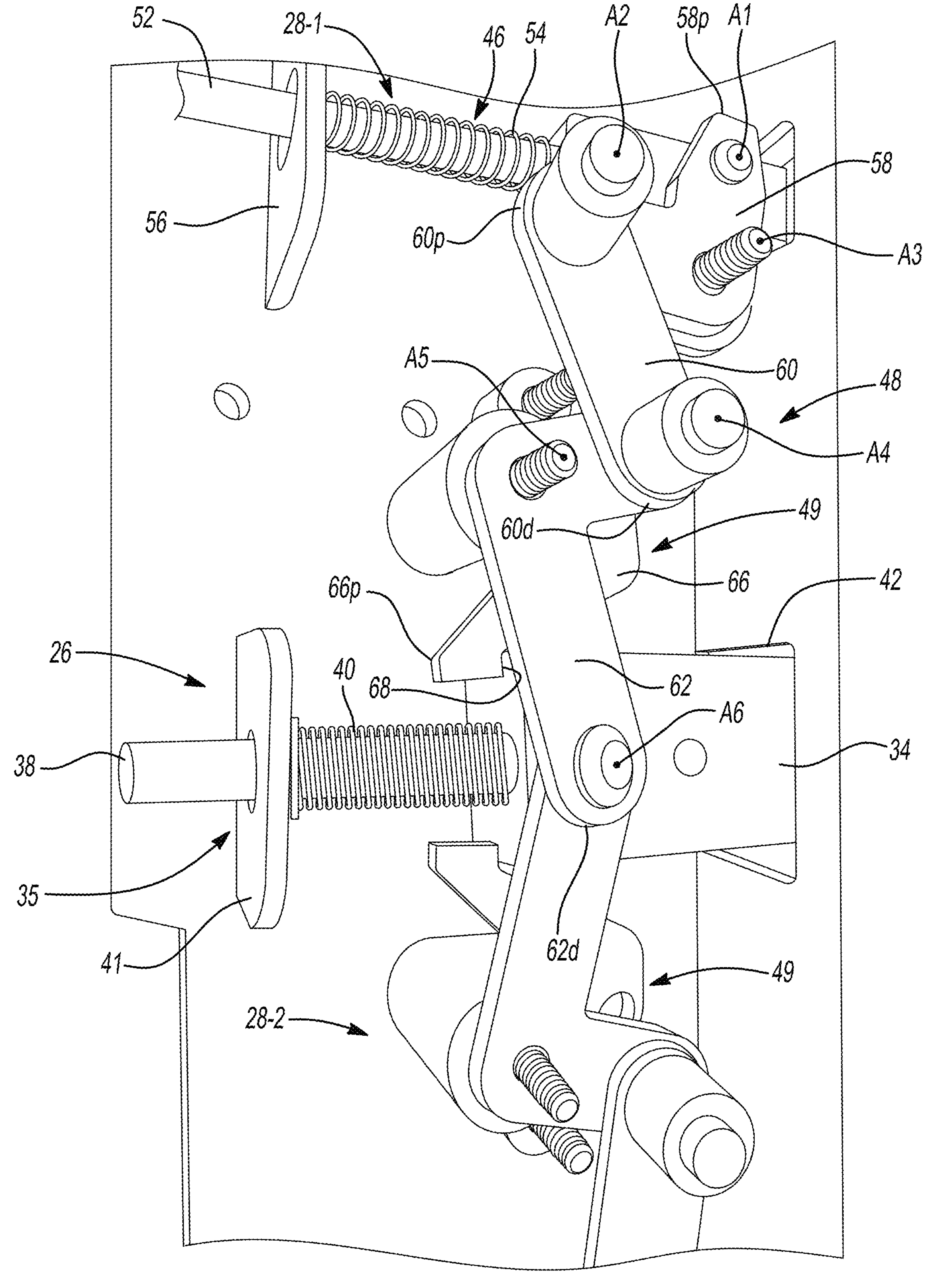
FIG. 2A is a second perspective view of the door locking system of FIG. 1A in the first orientation according to the principles of the present disclosure.
Figure 2B:
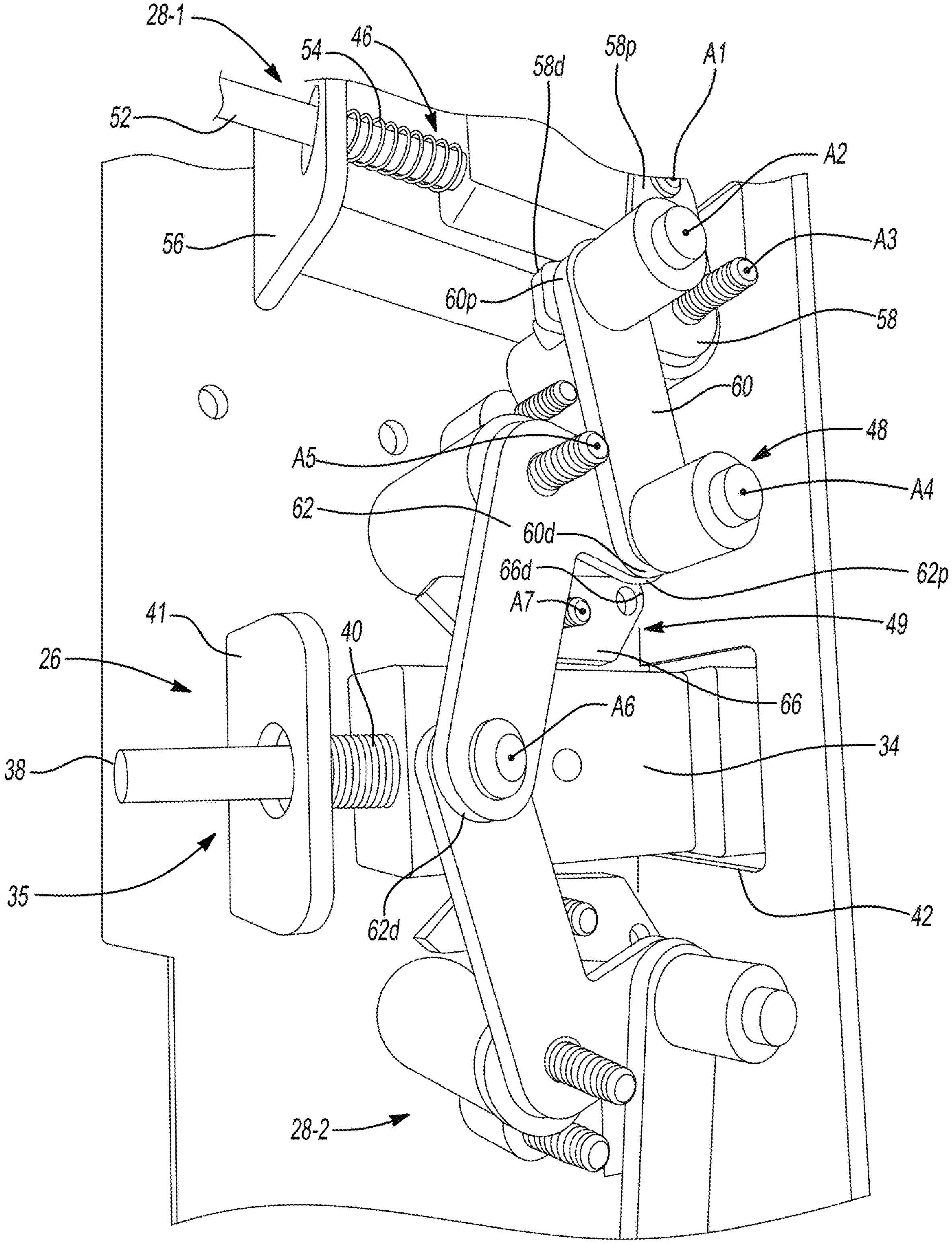
FIG. 2B is a perspective view of the door locking system of FIG. 1A in the second orientation according to the principles of the present disclosure.

With reference to FIGS. 2A and 2B, the linkage assembly 48 may include a first link 58, a second link 60, and a third link 62. The first link 58, the second link 60, and the third link 62 may each include a proximal end and a distal end. The first link 58 (e.g., the proximal end 58*p*) may be rotatably coupled to the actuator 46 (e.g., the post 52) for rotation about a first axis A1. The first link 58 (e.g., the distal end 58*d*) may be rotatably coupled to the second link 60 (e.g., the proximal end 60*p*) for rotation about a second axis A2. The first link 58 may be further rotatably coupled to the first housing 24 for rotation about a third axis A3.

The second link 60 (e.g., the distal end 60*d*) may be rotatably coupled to the third link 62 (e.g., the proximal end 62*p*) for rotation about a fourth axis A4. The third link 62 may be rotatably coupled to the first housing 24 for rotation about a fifth axis A5. The third link 62 may be further rotatably coupled to the plug 34 or a portion (e.g., post 38) of the plug actuation system 35 for rotation about a sixth axis A6.

The first link 58, the second link 60, and the third link 62 may each move (e.g., rotate) about a rotation feature (e.g., a hub) that defines the axes A1, A2, A3, A4, A5, A6, respectively. As the actuator 46 is forced into the first housing 24, the first link 58 may rotate in a counterclockwise direction about the third axis A3, and the third link 62 may rotate in a clockwise direction about the fifth axis A5 and force the plug 34 to move (e.g., translate) within the opening 42 from the plugged position (FIG. 1A) to the open position (FIG. 1B).

With reference to FIG. 1B, the deadlock assembly 49 may include a biasing member 64 (e.g., spring) and a link 66. The link 66 may include a proximal end 66*p* and a distal end 66*d*. The proximal end 66*p* may include a substantially planar locking surface 68. The link 66 may be rotatably coupled to the first housing 24 for rotation about an axis A7. For example, the link 66 may move (e.g., rotate) about a rotation feature (e.g., a hub) that defines the axis A7.

The biasing member 64 may include a proximal end 64*p* coupled to one of the second link 60 or the first housing 24, and a distal end 64*d* coupled to the link 66 (e.g., the distal end 66*d*). In some implementations, the biasing member 64 may be coupled to the second link 60 between the proximal and distal ends 60*p*, 60*d* thereof. As will be explained in more detail below, the biasing member 64 may apply a force on the link 66 urging counterclockwise rotation of the link 66 about the seventh axis A7. When the door 14 is in the open orientation (FIG. 2A), and the plug subassembly 26 is in the plugged position (FIG. 1A), the surface 68 may contact the plug 34 to further inhibit translation of the plug 34 relative to the first housing 24 when a force is applied on the plug 34.

The second actuation system 28-2 may include components (e.g., an actuator 46, a linkage assembly 48, and a deadlock assembly 49) having a similar structure and function as those described above relative to the first actuation system 28-1. In view of the similarity in structure and function of the first actuation system 28-1 and the second actuation system 28-2, the second actuation system 28-2 will not be separately described herein, and the description of the first actuation system 28-1 will be understood to apply equally to the second actuation system 28-2 except as otherwise noted. In some implementations, the third link 62 (e.g., the distal end 62*d*) of the first actuation system 28-1 may be rotatably coupled to the third link 62 (e.g., the distal end 62*d*) of the second actuation system 28-2 for rotation about the sixth axis A6 such that the third link 62 of the first actuation system 28-1 can rotate about the fifth axis A5 of the first actuation system 28-1 upon rotation of the third link 62 of the second actuation system 28-1 about the fifth axis A5 of the second actuation system 28-1. In this way, the actuator 46 of the first actuation system 28-1 or the actuator 46 of the second actuation system 28-2 may move from the first position (FIG. 1A) to the second position (FIG. 1B) upon simultaneous movement of the actuator 46 of the first actuation system 28-1 and the actuator 46 of the second actuation system 28-2 from the first position (FIG. 1A) to the second position (FIG. 1B).

The second housing assembly 22 may include a second housing 70 and a locking system 72 coupled to the second housing 70. The second housing 70 may include one or more ramps 74. The ramps 74 may be configured to receive the actuator 46 (e.g., the wheel 50) when the door 14 is in the closed orientation (FIG. 1B). The locking system 72 may include a lock mechanism 75 and a latch 77. The latch 77 may secure the position of the first housing assembly 20 relative to the second housing assembly 22 when the door 14 is in the closed orientation. For example, when the door 14 is in the closed orientation (FIG. 1B), the latch 77 may be disposed within the opening 42 of the first housing 24.

Referring now to FIGS. 3A-5, a lock system 10*a* is illustrated. In view of the substantial similarity in structure and function of the components associated with the lock system 10*a* with respect to the lock system 10, like reference numerals are used hereinafter, and in the drawings, to identify like components while like reference numerals containing letter extensions (e.g., "a") are used to identify those components that have been modified. Any references herein to the lock system 10, or any component thereof, will be understood to apply equally to the lock system 10*a*, or the corresponding component thereof, unless otherwise noted.

Figure 3B:
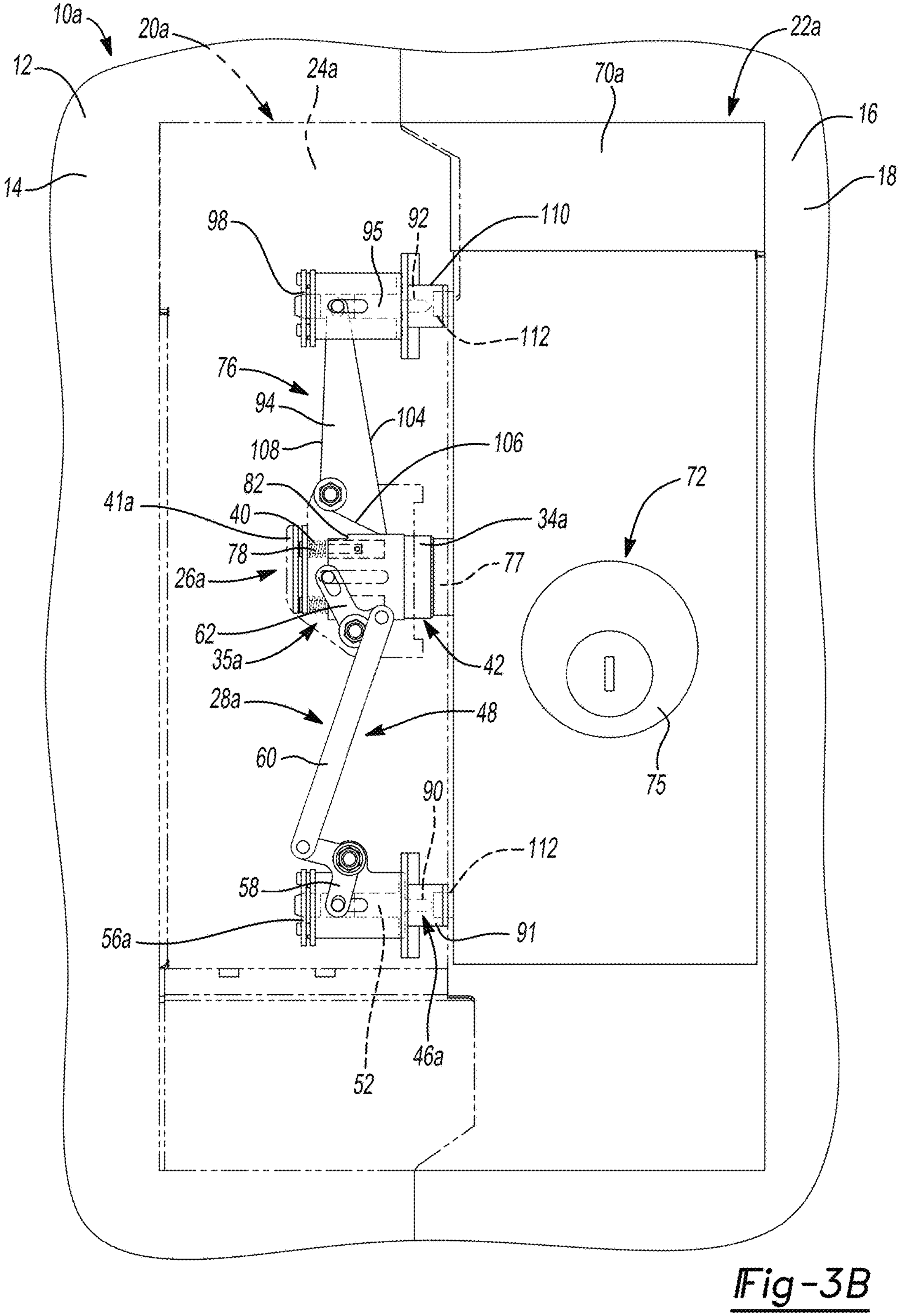
FIG. 3B is a perspective view of the door locking system of FIG. 3A in a second orientation according to the principles of the present disclosure.
Figure 4:
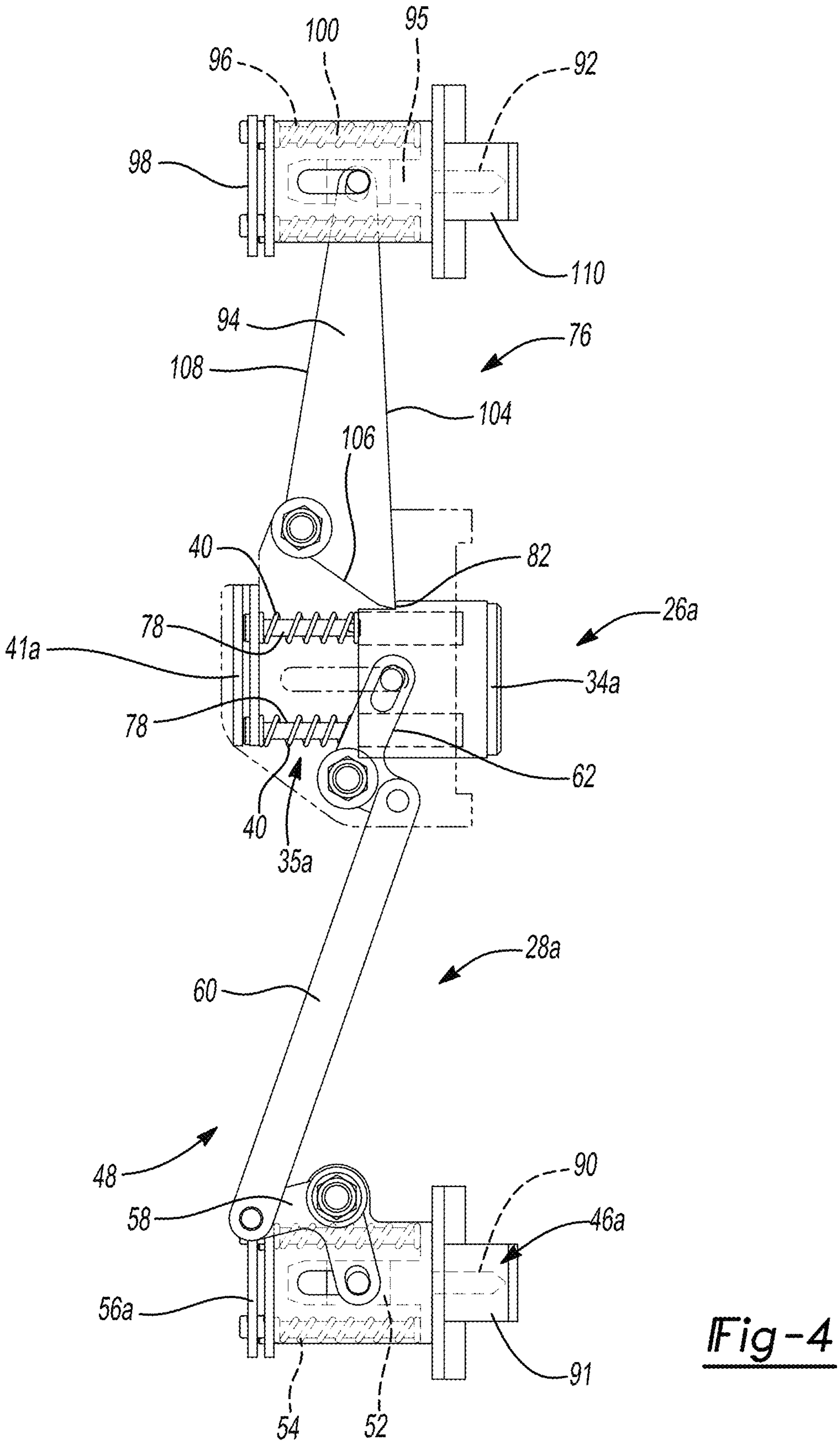
FIG. 4 is a front view of a first assembly of the door locking system of FIG. 3A according to the principles of the present disclosure.
Figure 5:
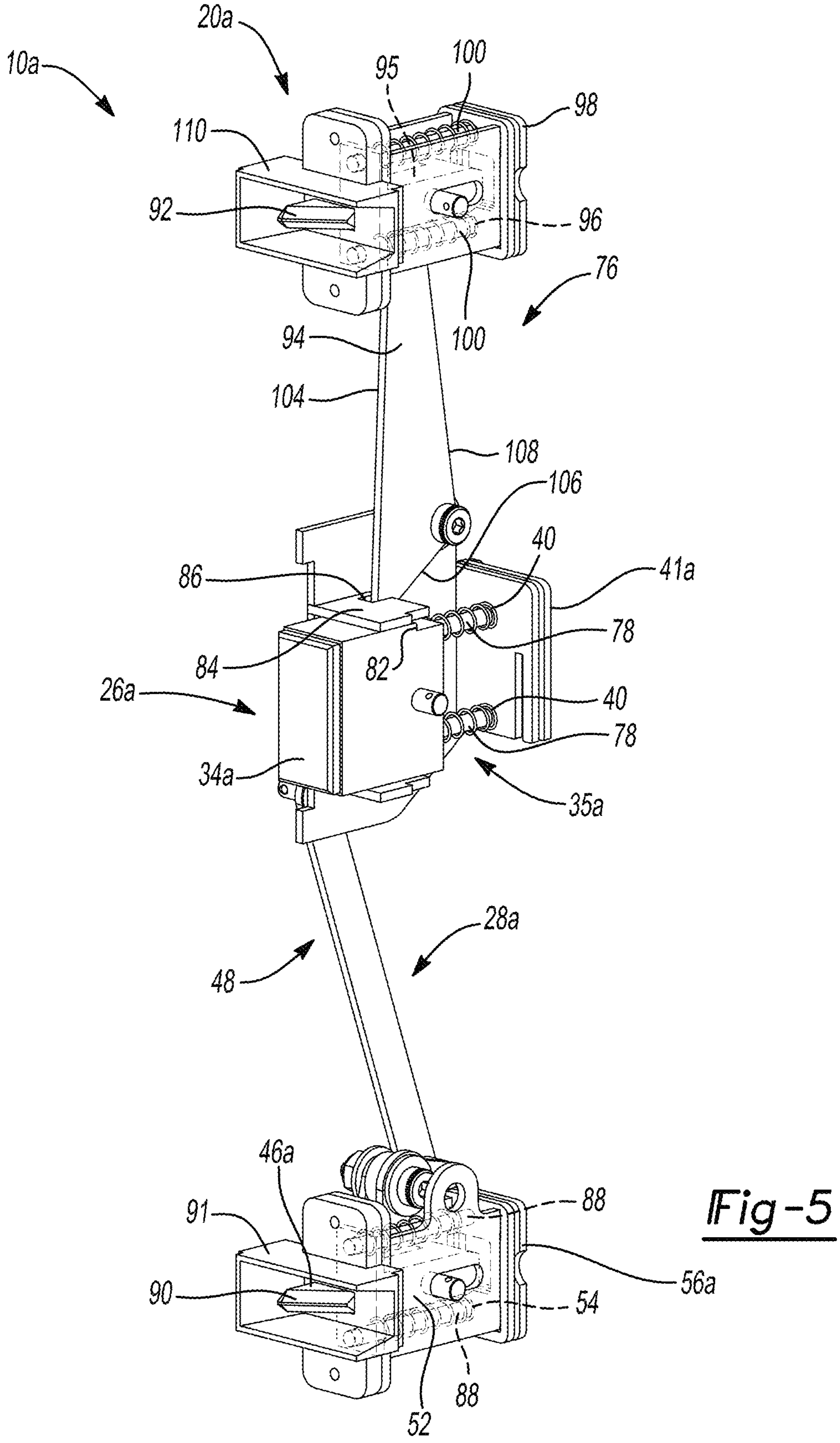
FIG. 5 is a perspective view of the first assembly of FIG. 4 according to the principles of the present disclosure.

The lock system 10*a* may include a first housing assembly 20*a* and a second housing assembly 22*a*. The first housing assembly 20*a* may include a first housing 24*a*, a plug subassembly 26*a*, an actuation system 28*a*, and a deadlock system 76. The plug subassembly 26*a*, the actuation system 28*a*, and the deadlock system 76 may be disposed within the first housing 24*a*. As will be explained in more detail below, the actuation system 28*a* may allow and/or inhibit movement of the plug subassembly 26*a* between a plugged position (FIG. 3A) and an open position (FIG. 3B). For example, in a method of operating the lock system 10*a*, movement of the actuation system 28*a* from a first orientation (FIG. 3B) to a second orientation (FIG. 3A) may move the plug subassembly 26*a* from the open position (FIG. 3B) to the plugged position (FIG. 3A) and inhibit movement of the plug subassembly 26*a* from the plugged position (FIG. 3A) to the open position (FIG. 3B), while movement of the actuation system 28*a* from the second orientation (FIG. 3A) to the first orientation (FIG. 3B) may move (e.g., automatically) the plug subassembly 26*a* from the plugged position (FIG. 3A) to the open position (FIG. 3B).

As will be explained in more detail below, engagement of the actuation system 28*a* with the second housing assembly 22*a* may actuate the actuation system 28*a* from the second orientation (FIG. 3A) to the first orientation (FIG. 3B) and move the plug subassembly 26*a* from the plugged position (FIG. 3A) to the open position (FIG. 3B). Conversely, disengagement of the actuation system 28*a* from the second housing assembly 22*a* may move (e.g., automatically) the plug subassembly 26*a* to the plugged position (FIG. 3A). When the lock system 10*a* is in an open orientation (FIG. 3A), the plug subassembly 26*a* may be in the plugged position (FIG. 3A). When the lock system 10*a* is in a closed orientation (FIG. 3B), the plug subassembly 26*a* may be in the open position (FIG. 3B).

The plug subassembly 26*a* may be coupled to the first housing 24*a* and may include a plug 34*a* and a plug actuation system 35*a*. In some implementations, the plug actuation system 35*a* includes one or more biasing members 40, and one or more guide rods 78. As illustrated in FIG. 3B, each of the one or more guide rods 78 may be coupled to the first housing 24*a* and translatably-coupled to the plug 34*a*. For example, the first housing 24*a* may include a bracket 41*a* to which each of the one or more guide rods 78 is coupled. The plug 34*a* may define one or more apertures and each of the one or more guide rods 78 may be disposed through a corresponding aperture of the one or more apertures. A biasing member 40 of the one or more biasing members 40 may be disposed around each of the one or more guide rods 78. As will be explained in more detail below, as the plug 34*a* moves from the plugged position (FIG. 3A) to the open position (FIG. 3B), or vice versa, the plug 34*a* may translate (e.g., slide) along the one or more guide rods 78.

In some implementations, the plug 34*a* includes a notch 82 in one or more sides of the plug 34*a*. The notch 82 may engage and disengage one or more components of the deadlock system 76 to allow and/or inhibit movement of the plug subassembly 26*a* (e.g., the plug 34*a*). In some implementations, the plug subassembly 26*a* includes a retaining clip 84 coupled to the plug 34*a*. The retaining clip 84 may include a slot 86 that receives one or more components of the deadlock system 76.

The actuation system 28*a* may include an actuator 46*a* and the linkage assembly 48. The actuator 46*a* may include the post 52, one or more guide rods 88 and one or more biasing members 54. The one or more guide rods 88 may be coupled to the first housing 24*a* and translatably-coupled to the actuator 46*a*. For example, the first housing 24*a* may include a bracket 56*a* to which one or more guide rods 88 are coupled. A biasing member 54 of the biasing members 54 may be disposed around each of the one or more guide rods 88. In some implementations, the bracket 56*a* defines an aperture through which the post 52 is disposed. In some implementations, the actuator 46*a* defines one or more apertures and each of the one or more guide rods 88 is disposed through a corresponding aperture of the one or more apertures. In some implementations, the actuator 46*a* includes a chamfered (e.g., sharpened) end 90. When the lock system 10*a* is in the open orientation (FIG. 3A), the chamfered end 90 may deter a user from engaging, or otherwise applying a force on, the actuator 46*a*.

When the lock system 10*a* is in the open orientation (FIG. 3A), the actuator 46*a* (e.g., the chamfered end 90) may extend outside the first housing 24*a*. For example, the chamfered end 90 may extend beyond the first side 44 of the first housing 24*a*. When the lock system 10*a* is in the closed orientation (FIG. 3B) the actuator 46*a* may be disposed inside the first housing 24. In this regard, as will be explained in more detail below, during operation of the lock system 10*a*, upon moving the door 14 from the closed position (FIG. 3B) to the open position (FIG. 3A), the biasing member(s) 54 may apply a force on the actuator 46*a* and the bracket 56*a* to move the actuator 46*a* relative to the first housing 24*a* (e.g., toward the second housing assembly 22*a*).

In some implementations, the actuation system 28*a* includes a covering 91 that at least partially covers the actuator 46*a*. For example, when the door 14 is in the open position (FIG. 3A), the covering 91 may prevent an individual from moving or tampering with the actuator 46*a*. When the door 14 is in the closed position (FIG. 3B), the covering 91 may receive one or more components of the second housing assembly 22*a*.

The deadlock system 76 may include an actuator 92 and a locking lever 94. As will be described in more detail below, the deadlock system 76 may be configured to allow and/or inhibit movement of the plug subassembly 26*a* between the plugged position (FIG. 3A) and the open position (FIG. 3B). For example, in a first orientation (FIG. 3A), the deadlock system 76 may engage the plug subassembly 26*a* and prevent the plug subassembly 26*a* from moving from the plugged position (FIG. 3A) to the open position (FIG. 3B). In a method of operating the lock system 10*a*, movement of the deadlock system 76 from the first orientation (FIG. 3A) to a second orientation (FIG. 3B) may disengage the deadlock system 76 from the plug subassembly 26*a* and allow the plug subassembly 26*a* to move from the plugged position (FIG. 3A) to the open position (FIG. 3B).

The actuator 92 may include a post 95, one or more guide rods 100 and one or more biasing members 96. The one or more guide rods 100 may be coupled to the first housing 24*a* and translatably-coupled to the actuator 92. For example, the first housing 24*a* may include a bracket 98 to which one or more guide rods 100 are coupled. A biasing member 96 of the biasing members 96 may be disposed around each of the one or more guide rods 100. In some implementations, the bracket 98 defines an aperture through which the post 95 is disposed. In some implementations, the actuator 92 defines one or more apertures and each of the one or more guide rods 100 is disposed through a corresponding aperture of the one or more apertures. In some implementations, the actuator 92 includes a chamfered (e.g., sharpened) end 102. When the lock system 10*a* is in the open orientation (FIG. 3A), the chamfered end 102 may deter a user from engaging, or otherwise applying a force on, the actuator 92. When the lock system 10*a* is in the open orientation (FIG. 3A), the actuator 92 (e.g., the chamfered end 102) may extend outside the first housing 24. For example, the chamfered end 102 may extend beyond the first side 44 of the first housing 24.

The locking lever 94 may be coupled (e.g., rotatably-coupled) to the actuator 92 and may have a substantially triangular shape. In this regard, the locking lever 94 may include a first edge 104, a second edge 106 transverse to the first edge 104, and a third edge 108 transverse to the first and second edges 104, 106. The first, second, and third edges 104, 106, 108 may define the substantially triangular shape of the locking lever 94. When the deadlock system 76 is in the first orientation (FIG. 3A), the locking lever 94 may be disposed within the slot 86 of the retaining clip 84 and the first edge 104 may engage the notch 82 of the plug 34*a*. When the deadlock system 76 is in the second orientation (FIG. 3B), the locking lever 94 may be disengaged from and disposed above the retaining clip 84.

As will be explained in more detail below, during operation of the lock system 10*a*, upon movement of the deadlock system 76 from the first orientation (FIG. 3A) to the second orientation (FIG. 3B), the locking lever 94 may begin to rotate (e.g., counterclockwise) and apply a force on the retaining clip 84 and/or the notch 82, which in turn may cause the plug 34*a* to extend further through the opening 42. The movement of the plug 34*a* may allow the locking lever 94 to disengage from the plug 34*a* (e.g., the notch 82 and/or the retaining clip 84) and continue to rotate (e.g., counterclockwise) until the locking lever 94 is disposed above the plug 34*a* (FIG. 3B). Once the locking lever 94 is in the second orientation (FIG. 3B), the plug 34*a* is free to retract within the first housing 24 (e.g., by movement of the actuation system 28*a*).

In some implementations, the deadlock system 76 includes a covering 110 that at least partially covers the actuator 92. For example, when the door 14 is in the open position (FIG. 3A), the covering 110 may prevent an individual from moving or tampering with the actuator 92. When the door 14 is in the closed position (FIG. 3B), the covering 110 may receive one or more components of the second housing assembly 22*a*.

The second housing assembly 22*a* may include a second housing 70*a* and the locking system 72. The locking system 72 may be coupled to the second housing 70*a*. The second housing 70*a* may include one or more protrusions 112. The one or more protrusions 112 may extend from the second housing 70*a* towards the first housing 24*a*. The one or more protrusions 112 may engage the actuator 46*a* and/or the actuator 92 when the door 14 is in the closed position (FIG. 3B). The one or more protrusions 112 may be disposed within the covering 91 and/or the covering 110 when the door 14 is in the closed position (FIG. 3B). In some implementations, each of the one or more protrusions 112 may include a tapered end 113.

Figure 6:
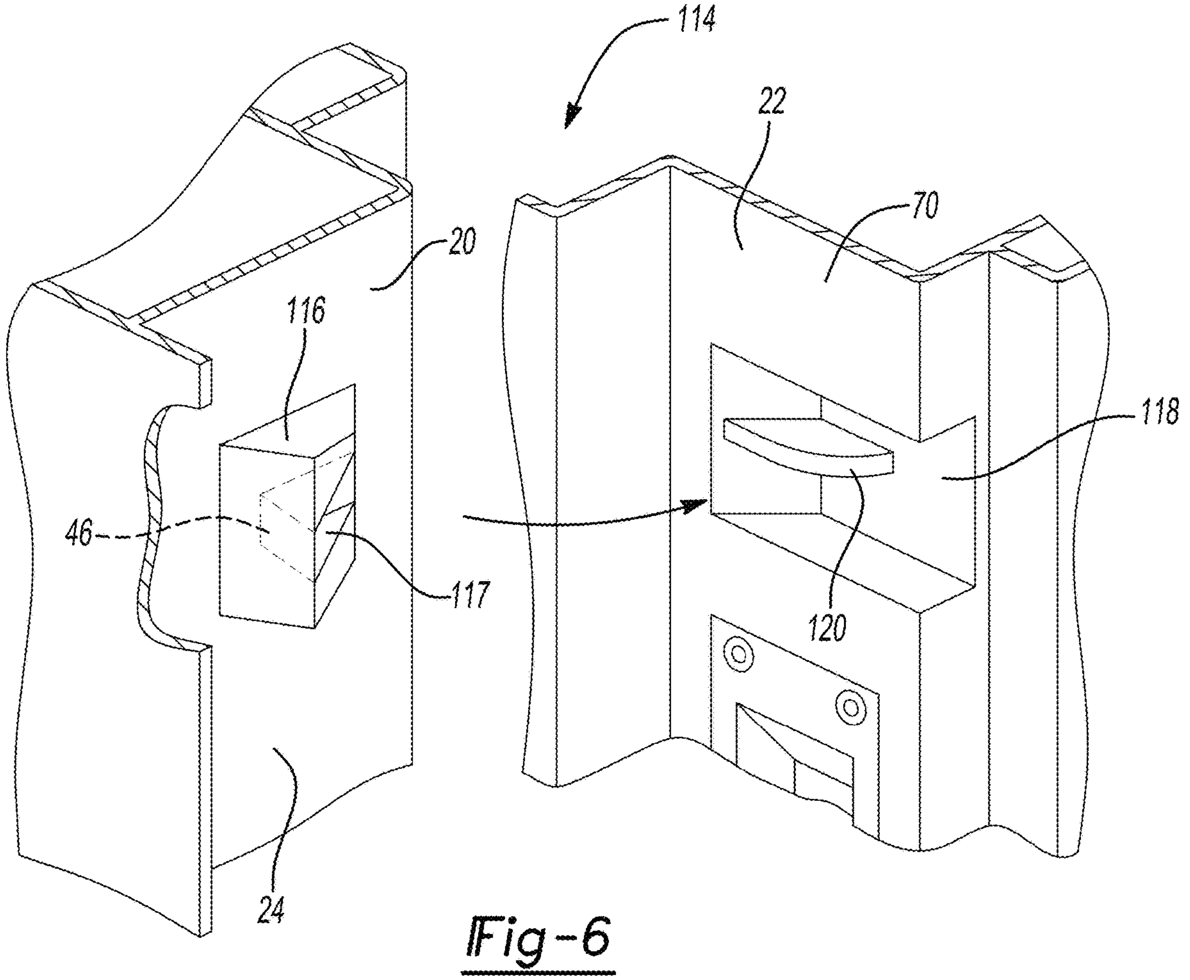
FIG. 6 is a perspective view of a portion of a door locking system in a first orientation according to the principles of the present disclosure.
Figure 7:
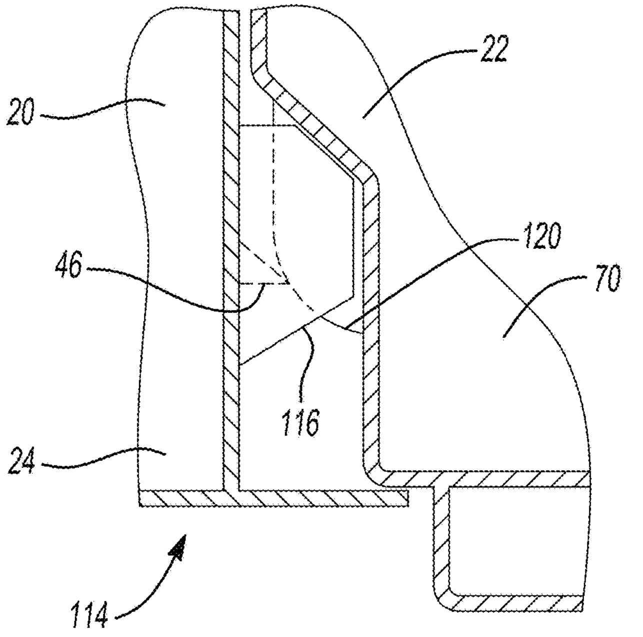
FIG. 7 is a top view of the portion of the door locking system of FIG. 6 in a second orientation according to the principles of the present disclosure.

Referring now to FIGS. 6 and 7, an activation system 114 is illustrated. The activation system 114 may be configured to work with the lock systems 10, 10*a*. For example, the activation system 114 may activate an actuation system (e.g., actuation system 28, 28*a*).

The activation system 114 may include one or more protrusions 116 extending from a first housing (e.g., the first housing 24, 24*a*). The one or more protrusions 116 may surround at least a portion of the actuators 46, 46*a*, 92. In this regard, each protrusion 116 may define a cavity 117. When the door 14 is in the open position (FIGS. 1A, 3A), each actuator 46, 46*a*, 92 may disposed in one of the cavities 117. When the door 14 is in the open position (FIGS. 1A, 3A), the one or more protrusions 116 may prevent an individual from moving or tampering with the actuators 46, 46*a*, 92. In some implementations, there is zero or near zero clearance between the one or more protrusions 116 and the actuators 46, 46*a*, 92.

The activation system 114 may include one or more recesses 118 formed in a second housing (e.g., the second housing 70, 70*a*). In some implementations, the one or more recesses 118 may replace the one or more ramps 74 or the one or more protrusions 112. Each recess of the one or more recesses 118 may include a striker 120 extending from the recess 118. As illustrated in FIG. 6, the striker 120 may include a convex outer surface. When the door 14 is in the closed position (FIGS. 1B, 3B), each striker 120 (e.g., the convex outer surface) may engage and/or move (e.g., translate, roll, etc.) along one of the actuators 46, 46*a*, 92. In this regard, each protrusion 116 may disposed in one of the recesses 118 and each of the strikers 120 may be disposed in one of the cavities 117 when the door 14 is in the closed position (FIGS. 1B, 3B). Engagement of the striker 120 with the actuator 46, 46*a*, 92 may urge movement (e.g., translation) of the actuator 46, 46*a*, 92 within the first housing 24, 24*a*.

Figure 8A:
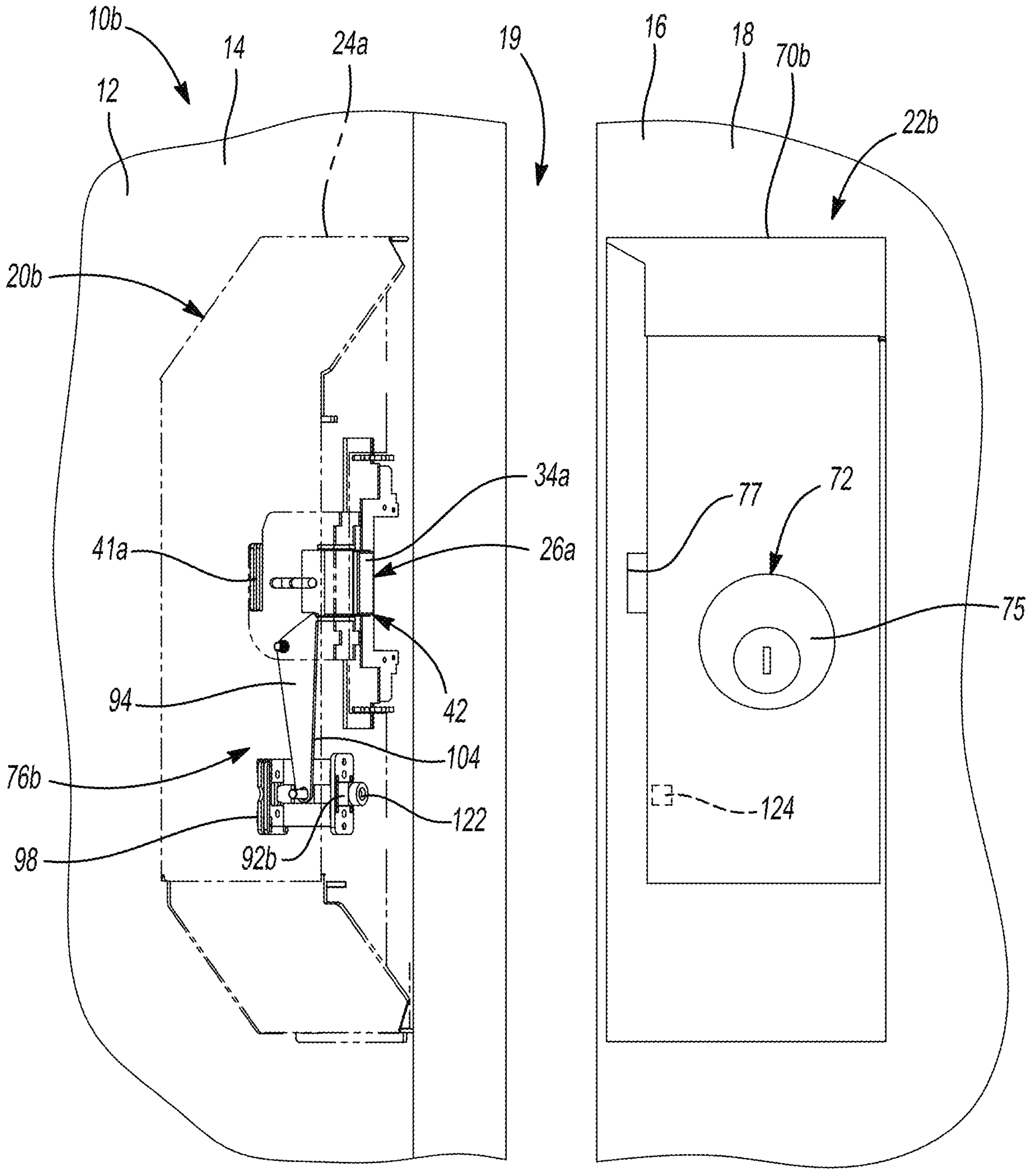
FIG. 8A is a perspective view of another door locking system in a first orientation according to the principles of the present disclosure.
Figure 8B:
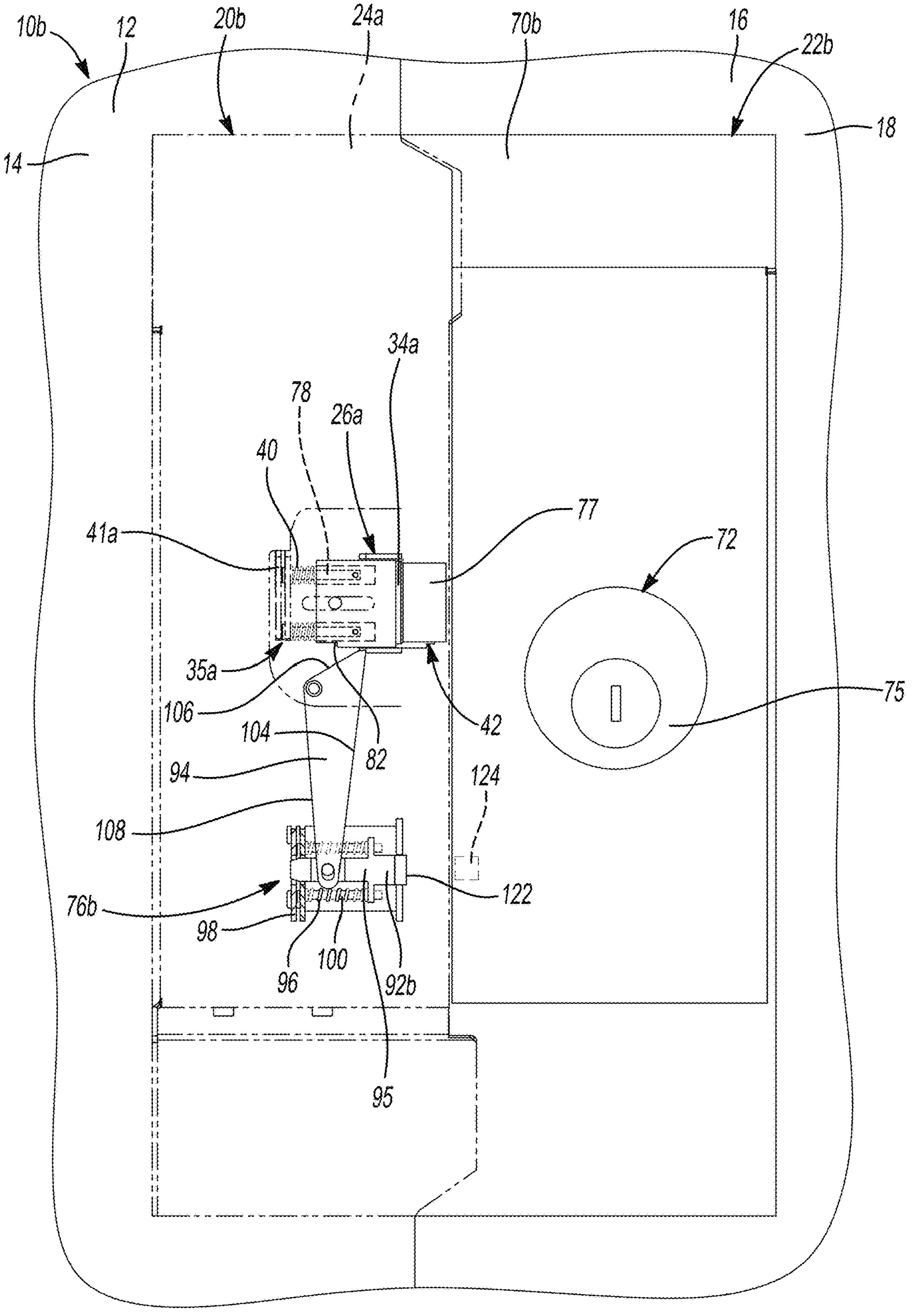
FIG. 8B is a perspective sectional view of the door locking system of FIG. 8A in a second orientation according to the principles of the present disclosure.
Figure 9:
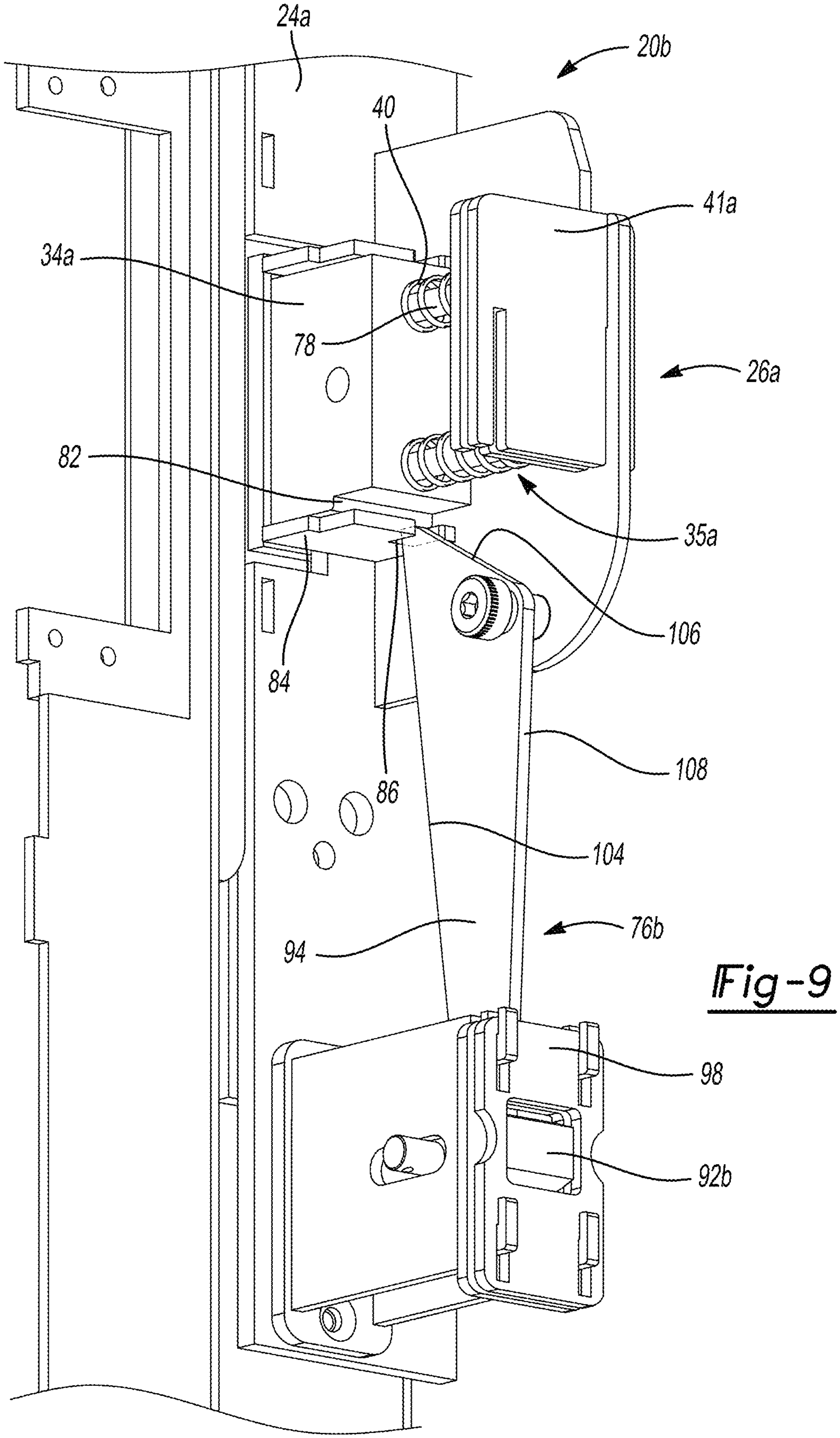
FIG. 9 is a perspective view of a first assembly of the door locking system of FIG. 8A according to the principles of the present disclosure.

Referring now to FIGS. 8A, 8B, and 9, a lock system 10*b* is illustrated. In view of the substantial similarity in structure and function of the components associated with the lock system 10*b* with respect to the lock systems 10, 10*a*, like reference numerals are used hereinafter, and in the drawings, to identify like components while like reference numerals containing letter extensions (e.g., "b") are used to identify those components that have been modified. Any references herein to the lock system 10 or 10*a*, or any component thereof, will be understood to apply equally to the lock system 10*b*, or the corresponding component thereof, unless otherwise noted.

The lock system 10*b* may include a first housing assembly 20*b* and a second housing assembly 22*b*. The first housing assembly 20*a* may include the first housing 24*a*, the plug subassembly 26*a*, and a deadlock system 76*b*. The plug subassembly 26*a* and the deadlock system 76*b* may be disposed within the first housing 24*a*. The deadlock system 76*b* may include an actuator 92*b* and the locking lever 94. As will be described in more detail below, the deadlock system 76*b* may be configured to allow and/or inhibit movement of the plug subassembly 26*a* between the plugged position (FIG. 8A) and the open position (FIG. 8B). For example, in a first orientation (FIG. 8A), the deadlock system 76*b* may engage the plug subassembly 26*a* (e.g., the plug 34 or the notch 82) and prevent the plug subassembly 26*a* from moving from the plugged position (FIG. 8A) to the open position (FIG. 8B).

The actuator 92*b* may include the post 95, the one or more guide rods 100, the one or more biasing members 96, and a magnet 122. The magnet 122 may be disposed at an end of the actuator 92*b*. In the open orientation (FIG. 8A), the end of the actuator 92*b* that includes the magnet 122 may extend outside the first housing 24*a*. For example, the magnet 122 may extend beyond the first side 44 of the first housing 24*a*. As will be explained in more detail below, the magnet 122 may interact with a corresponding feature on the second housing assembly 22*b* to urge movement of the actuator 92*b* (e.g., as the door 14 pivots (e.g., clockwise) relative to the wall 18 from an open orientation (FIG. 8A) to the closed orientation (FIG. 8B)).

The second housing assembly 22*b* may include a second housing 70*b* and the locking system 72. The locking system 72 may be coupled to the second housing 70*b*. The second housing 70*b* may include a magnet 124 disposed on or within the second housing 70*b*. For example, the magnet 124 may be disposed on or near a first side 126 of the second housing 70*b*. When the door 14 is in the closed orientation (FIG. 8B), the first side 126 of the second housing 70*b* may face the first housing assembly 20*b*. In some implementations, the magnets 122, 124 are oriented such that when the door 14 is in the closed orientation (FIG. 8B), the magnets 122, 124 have the same poles (e.g., north or south poles) facing one another. In this regard, as the door 14 pivots (e.g., clockwise) from the open orientation (FIG. 8A) to the closed orientation (FIG. 8B), the magnetic force between the magnets 122, 124 increases, thereby urging movement of the actuator 92*b* inside the first housing 24*a*. When the door 14 is in the closed orientation (FIG. 8B), the magnetic force created between the magnets 122, 124 may be stronger than the force imparted upon the actuator 92*b* by the one or more biasing members 96. As the door 14 pivots (e.g., counterclockwise) from the closed orientation (FIG. 8B) to the open orientation (FIG. 8A), the magnetic force between the magnets 122, 124 decreases. Once the force imparted upon the actuator 92*b* by the one or more biasing members 96 is stronger than the magnetic force, the one or more biasing members 96 may urge the actuator 92*b* to extend outside the first housing 24*a*.

A method of operating a lock system (e.g., lock systems 10, 10*a*, 10*b*) will now be described with reference to FIGS. 1A-9. In a step of operating the lock system 10, the door 14 is moved from the open orientation (FIG. 1A) to the closed orientation (FIG. 1B). In the open orientation, the first housing assembly 20, 20*a*, 20*b* is spaced apart from the second housing assembly 22, 22*a*, 22*b* and the plug subassembly 26, 26*a* and the actuator 46, 46*a* may extend outside of the first housing 24. For example, the plug subassembly 26, 26*a* and the actuator 46, 46*a* may extend beyond the first side 44.

As the door 14 moves from the open orientation to the closed orientation, the first housing assembly 20, 20*a*, 20*b* may contact the second housing assembly 22, 22*a*, 22*b*. For example, the actuator 46, 46*a* (e.g., the wheel 50 or the chamfered end 90) may engage (e.g., roll along or slide against) the ramp 74. As the actuator 46, 46*a* moves along the ramp 74, the ramp 74 may push the actuator 46, 46*a* into the first housing 24. The movement of the actuator 46, 46*a* into the first housing 24 may, in turn, move the actuation system(s) 28 (e.g., the first actuation system 28-1 or the actuation system 28*a*). For example, translation of the actuator 46, 46*a* towards the first housing 24 may cause the first link 58 to rotate (e.g., counter-clockwise) about the axis A1. Rotation of the first link 58 may cause the second link 60 to rotate about the axis A2. Rotation of the second link 60 may cause the third link 62 to rotate about the axis A5. Rotation of the third link 62 may cause the plug 34, 34*a* to retract (e.g., translate) inside the first housing 24. For example, the rotation of the third link 62 may apply a force on the plug 34, 34*a* that is opposite, and greater than, the force applied by the deadlock assembly 49 (e.g., surface 68). Translation of the plug 34 within the first housing 24 may cause the link 66 to rotate and allow the plug 34 to retract inside the first housing 24.

In configurations with the second actuation system 28-2, the movement of the second actuation system 28-2 is similar to the movement of the first actuation system 28-1 described above. Movement of the first actuation system 28-1 and the second actuation system 28-2 may occur simultaneously.

In configurations with the deadlock system 76, the deadlock system 76 may move from the first orientation (FIG. 3A) to the second orientation (FIG. 3B) as the actuation system(s) 28 (e.g., the first actuation system 28-1 or the actuation system 28*a*) moves from the second orientation (FIG. 3A) to the first orientation (FIG. 3B). Movement of the deadlock system 76 from the first orientation (FIG. 3A) to the second orientation (FIG. 3B) allows the plug subassembly 26, 26*a* to move from the plugged position (FIGS. 1A, 3A) to the open position (FIGS. 1B, 3B). Movement of the deadlock system 76 and the actuation system(s) 28 (e.g., the first actuation system 28-1 or the actuation system 28*a*) may occur simultaneously.

In configurations without an actuation system 28, 28*a*, the latch 77 contacts the plug subassembly 26, 26*a* to move from the plugged position (FIGS. 1A, 3A, 8A) to the open position (FIGS. 1B, 3B, 8B).

When the lock system 10 reaches the closed orientation, the plug subassembly 26 is retracted within the first housing 24 and the latch 77 extends into the opening 42 of the first housing 24.

The configuration and operation of the lock systems 10, 10*a*, 10*b* described herein can prevent an individual (e.g., an inmate) from forcing items (e.g., contraband) into the opening 42 of the first housing 24 when the door 14 is in the open orientation, thus ensuring that the opening can receive the latch 77 when the lock system 10, 10*a*, 10*b* is in the closed orientation (FIG. 1B, 3B, 8B).

The following Clauses provide exemplary configurations for a lock system, as described above.

Clause 1: A lock system comprising: a first housing including a first side defining an opening; a plug disposed within the first housing and configured to move within the opening between an open position and a plugged position; and a first actuation system disposed within the first side of the first housing and configured to move between a first position and a second position, wherein the first actuation system (i) moves the plug from the plugged position to the open position when the first actuation system moves from the first position to the second position, and (ii) secures the plug in the plugged position when the first actuation system moves from the second position to the first position.

Clause 2: The lock system of clause 1, wherein the plug is disposed within the opening when the plug is in the plugged position.

Clause 3: The lock system of any of clauses 1 through 2, wherein the first actuation system includes: an actuator; and a linkage assembly coupled to the actuator and the plug.

Clause 4: The lock system of clause 3, wherein the actuator extends outside the first housing when the first actuation system is in the first position and retracts within the first housing when the first actuation system is in the second position.

Clause 5: The lock system of clause 4, further comprising a second housing including a latch.

Clause 6: The lock system of clause 5, wherein the actuator is configured to engage the second housing when the first actuation system is in the second position.

Clause 7: The lock system of clause 6, wherein the second housing includes a ramp configured to engage the actuator when the first actuation system is in the second position.

Clause 8: The lock system of clause 7, wherein the first actuation system moves from the first position to the second position as the actuator engages with the ramp.

Clause 9: The lock system of clause 8, wherein the latch is in a locked position when the plug is in the open position, and the opening is configured to receive the latch when the latch is in the locked position.

Clause 10: The lock system of any of clauses 1 through 9, further comprising a second actuation system coupled to the plug and configured to move between a third position and a fourth position, wherein the second actuation system moves the plug from the plugged position to the open position when the second actuation system moves from the third position to the fourth position.

Clause 11: A lock system comprising: a first housing defining an opening; a plug supported by the first housing and configured to move between an open position and a plugged position; and a first actuation system coupled to the plug and configured to move between a first position and a second position, wherein the first actuation system (i) moves the plug from the plugged position to the open position when the first actuation system moves from the first position to the second position, and (ii) secures the plug in the plugged position when the first actuation system moves from the second position to the first position.

Clause 12: The lock system of clause 11, further comprising a deadlock system coupled to the plug and configured to move between a third position and a fourth position.

Clause 13: The lock system of clause 12, wherein the deadlock system (i) inhibits movement of the plug in the third position and (ii) allows movement of the plug in the fourth position.

Clause 14: The lock system of clauses 12 or 13, wherein the deadlock system moves from the third position to the fourth position when the first actuation system moves from the first position to the second position.

Clause 15: The lock system of any of clauses 12 through 14, wherein the deadlock system includes: an actuator, and a locking lever coupled to the actuator and configured to engage the plug.

Clause 16: The lock system of clause 15, wherein the plug includes a retaining clip configured to receive the locking lever.

Clause 17: The lock system of clauses 15 or 16, wherein the plug includes a notch and the locking lever is configured to engage the notch when the deadlock system is in the third position.

Clause 18: The lock system of any of clauses 15 through 17, wherein the locking lever is disposed above the plug when the deadlock system is in the fourth position.

Clause 19: The lock system of any of clauses 15 through 18, wherein the actuator includes a chamfered end.

Clause 20: The lock system of any of clauses 11 through 19, wherein the plug is disposed within the opening when the plug is in the plugged position.

Clause 21: A lock system comprising: a first housing including a first side defining an opening; a plug disposed within the first housing and configured to move within the opening between an open position and a plugged position; and a deadlock system disposed within the first side of the first housing and coupled to the plug, the deadlock system configured to move between a first position and a second position, wherein the deadlock system (i) inhibits movement of the plug in the first position and (ii) allows movement of the plug in the second position.

Clause 22: The lock system of clause 21, further comprising a first actuation system coupled to the plug and configured to move between a third position and a fourth position.

Clause 23: The lock system of clause 22, wherein the first actuation system (i) moves the plug from the plugged position to the open position when the first actuation system moves from the third position to the fourth position, and (ii) secures the plug in the plugged position when the first actuation system moves from the fourth position to the second position.

Clause 24: The lock system of clauses 22 or 23, wherein the deadlock system moves from the first position to the second position when the first actuation system moves from the third position to the fourth position.

Clause 25: The lock system of any of clauses 21 through 24, wherein the deadlock system includes: an actuator, and a locking lever rotatably coupled to the actuator and configured to engage the plug.

Clause 26: The lock system of clause 25, wherein the plug includes a retaining clip configured to engage the locking lever.

Clause 27: The lock system of clauses 35 or 36, wherein the plug includes a notch configured to receive the locking lever when the deadlock system is in the first position.

Clause 28: The lock system of any of clauses 35 through 37, wherein the locking lever is configured to rotate relative to the plug when the deadlock system moves between the first position and the second position.

Clause 29: The lock system of any of clauses 35 through 38, wherein the actuator includes a chamfered end.

Clause 30: The lock system of any of clauses 31 through 39, wherein the plug is disposed within the opening when the plug is in the plugged position.

CONCLUSION

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

The invention claimed is:

1. A lock system comprising:

a first housing including a first side defining an opening;

a plug disposed within the first housing and configured to move within the opening between a first position and a second position; and a deadlock system disposed within the first side of the first housing and operatively coupled to the plug, the deadlock system including:

an actuator engaging the plug and configured to move between a third position and a fourth position, and a biasing member coupled to the actuator and configured to move the actuator between the third position and the fourth position, wherein:

the actuator (i) inhibits movement of the plug in the third position and (ii) allows movement of the plug in the fourth position, and movement of the biasing member disengages the actuator from the plug to allow movement of the plug.

2. The lock system of claim 1, further comprising a first actuation system coupled to the plug and configured to move between a fifth position and a sixth position.

3. The lock system of claim 2, wherein the first actuation system (i) moves the plug from the second position to the first position when the first actuation system moves from the fifth position to the sixth position, and (ii) secures the plug in the second position when the first actuation system moves from the sixth position to the fifth position.

4. The lock system of claim 3, wherein the deadlock system moves from the third position to the fourth position when the first actuation system moves from the fifth position to the sixth position.

5. The lock system of claim 1, wherein the deadlock system includes a locking member configured to engage the actuator and the plug.

6. The lock system of claim 5, wherein the plug includes a retaining clip configured to engage the locking member.

7. The lock system of claim 5, wherein the plug includes a notch configured to receive the locking member when the deadlock system is in the third position.

8. The lock system of claim 5, wherein the locking member is configured to move relative to the plug when the deadlock system moves between the third position and the fourth position.

9. The lock system of claim 1, wherein the actuator includes a chamfered end.

10. The lock system of claim 1, wherein the plug is disposed within the opening when the plug is in the second position.

11. A lock system comprising:

a first housing including a first side defining an opening;

a plug disposed within the first housing and configured to move within the opening between a first position and a second position;

a deadlock system disposed within the first side of the first housing and including:

an actuator engaging the plug and configured to move between a third position and a fourth position, and a biasing member coupled to the actuator and configured to move the actuator between the third position and the fourth position, and a first actuation system disposed within the first side of the first housing and configured to move between a fifth position and a sixth position, wherein the first actuation system (i) moves the plug from the second position to the first position when the first actuation system moves from the fifth position to the sixth position, and (ii) secures the plug in the second position when the first actuation system moves from the sixth position to the fifth position, and wherein movement of the biasing member disengages the actuator from the plug to allow movement of the plug.

12. The lock system of claim 11, wherein the plug is disposed within the opening when the plug is in the second position.

13. The lock system of claim 11, wherein the first actuation system includes:

a second actuator; and a linkage assembly coupled to the second actuator and the plug.

14. The lock system of claim 13, wherein the second actuator extends outside the first housing when the first actuation system is in the fifth position and retracts within the first housing when the first actuation system is in the sixth position.

15. The lock system of claim 14, further comprising a second housing including a latch.

16. The lock system of claim 15, wherein the second actuator is configured to engage the second housing when the first actuation system is in the sixth position.

17. The lock system of claim 16, wherein the second housing includes a ramp configured to engage the second actuator when the first actuation system is in the sixth position.

18. The lock system of claim 17, wherein the first actuation system moves from the fifth position to the sixth position as the second actuator engages with the ramp.

19. The lock system of claim 18, wherein the latch is in a locked position when the plug is in the first position, and the opening is configured to receive the latch when the latch is in the locked position.

20. The lock system of claim 11, further comprising a second actuation system coupled to the plug and configured to move between a seventh position and an eighth position, wherein the second actuation system automatically moves the plug from the second position to the first position when the second actuation system moves from the seventh position to the eighth position.

21. The lock system of claim 1, wherein the biasing member is a spring.

22. The lock system of claim 1, wherein the actuator includes a magnet disposed at an end of the actuator.

23. The lock system of claim 1, wherein the deadlock system is coupled to the plug.

* * * * *